(12) United States Patent
Valtanen

(10) Patent No.: US 6,455,127 B1
(45) Date of Patent: Sep. 24, 2002

(54) PROTECTIVE STRUCTURE

(75) Inventor: Jarkko Valtanen, Helsinki (FI)

(73) Assignee: Variform Oy, Helsinki (FI)

( * ) Notice: Subject to any disclaimer, the term of this patent is extended or adjusted under 35 U.S.C. 154(b) by 0 days.

(21) Appl. No.: 09/284,282

(22) PCT Filed: Sep. 15, 1997

(86) PCT No.: PCT/FI97/00545

§ 371 (c)(1),
(2), (4) Date: Apr. 12, 1999

(87) PCT Pub. No.: WO98/17357

PCT Pub. Date: Apr. 30, 1998

(30) Foreign Application Priority Data

Oct. 18, 1996 (FI) .................................................. 964199
Dec. 31, 1996 (FI) .................................................. 965279

(51) Int. Cl.⁷ .............................................. B32B 3/24
(52) U.S. Cl. .................. 428/137; 428/131; 428/119; 428/45; 428/81; 428/156; 428/158; 428/304.4; 404/35; 404/37; 47/29.5; 47/31.1; 47/29.3; 52/588.1; 52/589.1
(58) Field of Search ................................ 428/137, 131, 428/119, 45, 81, 156, 158, 304.4; 404/35, 37; 47/29.5, 31.1, 29.3; 52/588.1, 589.1

(56) References Cited

U.S. PATENT DOCUMENTS

| 1,169,212 A | * | 1/1916 | Weber | 404/35 |
| 3,859,000 A | | 1/1975 | Webster | 414/41 |
| 3,863,387 A | | 2/1975 | Webster et al. | 47/29 |
| 3,870,587 A | | 3/1975 | Merrell | 161/37 |
| 4,226,064 A | * | 10/1980 | Kraayenhof | 52/180 |
| 4,826,351 A | * | 5/1989 | Haberhauer et al. | 404/35 |
| 5,234,738 A | * | 8/1993 | Wolf | 428/120 |
| 5,364,204 A | * | 11/1994 | MacLeod | 404/35 |
| 5,687,652 A | * | 11/1997 | Ruma | 108/57.25 |
| 5,822,944 A | * | 10/1998 | Penland, Sr. | 52/591.1 |

FOREIGN PATENT DOCUMENTS

| DE | 1 459 740 | 12/1968 |
| DE | 23 33 623 | 1/1975 |
| DE | 36 05 959 A1 | 7/1987 |
| DE | 43 09 075 A1 | 9/1993 |
| GB | 1061 | 3/1914 |
| SE | 440 729 | 8/1985 |
| WO | WO 95/09681 | 4/1995 |

* cited by examiner

Primary Examiner—William P. Watkins, III
(74) Attorney, Agent, or Firm—Swidler Berlin Shereff Friedman, LLP

(57) ABSTRACT

A surface-covering protective structure. A thermal insulation layer has a basic wall thickness, fastening elements and a support arrangement integral with and projecting from the basic wall thickness of the thermal insulation layer. The support arrangement includes a plurality of supporting feet each comprising a supporting surface being operable to engage a protected surface that the protective structure is arranged on. The support arrangement is operable to physically separate the basic wall thickness of the thermal insulation layer from the protected surface. The fastening elements are operable to couple adjacent protective structures together. The protective structure, including the basic insulation layer, the fastening elements, and the support arrangement, includes thermally insulating plastic material operable to thermally insulate the protected surface.

38 Claims, 5 Drawing Sheets

PROTECTIVE STRUCTURE

REFERENCE TO RELATED APPLICATION

Figure 1A:
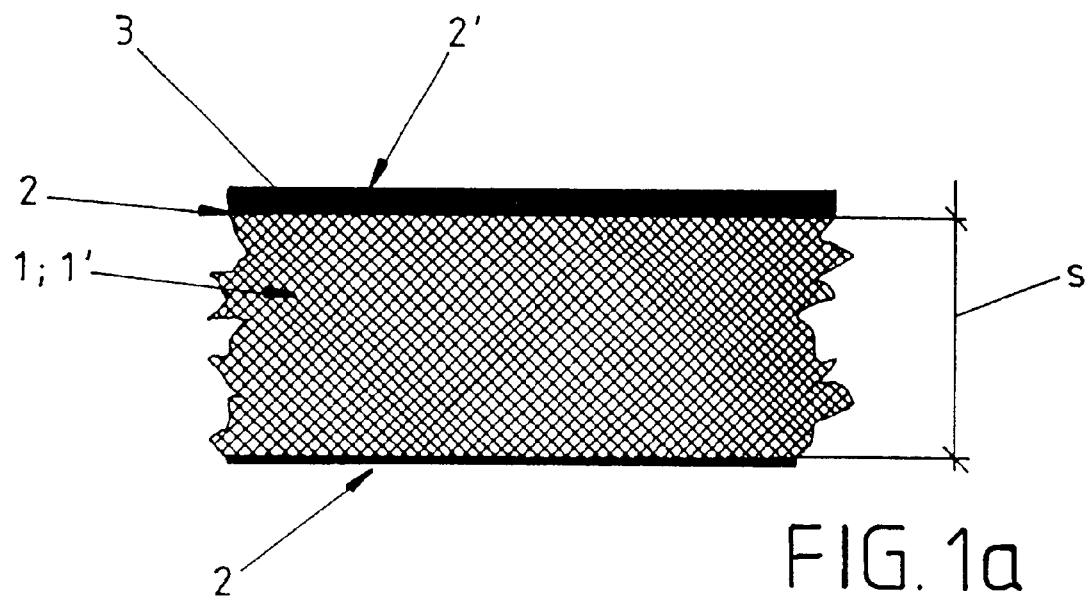

This Application is a 371 of PCT/FI97/00545, filed Sep. 9, 1997.

The invention relates to a protective structure, such as a protecting plate or element, that is meant particularly for covering of ground to protect and/or coat the same and/or for a like purpose and, into which there has been arranged at least a thermal insulation and a support arrangement for supporting of the same onto the ground.

For the purpose above, particularly for covering a field of grass or e.g. of ice, it is previously known to use most heterogeneous arrangements. For example covering elements being sold nowadays by the name TERRAPLAS represent particularly more developed solutions, that are made of plastics by injection moulding. To minimize mass of the covering element in question, it has been produced as a perforated structure in a way, that not any actual thermal insulation effect may be achieved by the type of covering element. Correspondingly the support arrangements to support the covering elements against the ground must furthermore be attached to the covering elements by means of totally separate auxiliary devices and work stages. In addition to this locking arrangements connecting the covering elements to each other must be attached separately as well, so that a uniform covering may be achieved by the type of covering elements. The "perforated" structure of the type of covering element above does not either enable exploitation of a so called green house phenomen particularly in connection with a grass field.

The perforated structure of the covering element in question is naturally advantageous with a view to the breathing of the ground, but the perforation causes in addition to those thermal insulation problems such disadvantage as well, that garbage may get collected between the covering and the ground, which naturally eliminates good points of the covering element in question in this respect.

On the other hand it is previously known to use e.g. styrox particularly for covering of ice fields, that has been surrounded by both sides of the same by plywood plate. This type of solution is naturally not applicable as such to be installed particularly on a grass field, in case not totally separate foot structures are being used to raise the covering structure apart from the ground. On the other hand when being used in connection with an ice field, such problem of this type of solution has been found, that the plywood plates tend to freeze to the ice, that is why loosening of the same is laborious. In addition to that the type of constructions are very heavy, that is why storing as well as use of the same in actual coating is disproportionately difficult.

On the other hand application document DE 41 12 757 discloses a covering element, in which there has been arranged a supporting arrangement, that comprises a platform structure under the same to achieve e.g. an air space between the covering element and the ground under the same. In this solution the actual platform structure has been formed, however, from a separate material layer, that has been attached fixedly e.g. by means of a glue layer to the actual frame structure, to the opposite surface of which there has been attached e.g. by a glue layer a surface layer. In the solution in question there has been exploited furthermore rubber based material, that is why not any particular thermal isolation effect may be achieved with the covering element in question. Because production of the solution in question requires several work stages, this type of covering elements get disproportionately expensive. Furthermore in patent U.S. Pat. No. 4,291,851 there has been represented a structure solution, that is not meant particularly as a covering element to be applicable for temporary protecting of ground, but instead as a uniform and constant internal casing of an aeroplane, that is why it is not in any way obvious to exploit the construction in question of the same for the purpose described herewith. Furthermore in patent U.S. Pat. No. 3,870,587 there has been shown differing panels, the constructions of which are very traditional and which are applicable e.g. for covering of ice field, but the compositions of which correspond mainly the prior art technics described in the beginning, that is why they are particularly expensive to produce. This is why they do not have either any kind of price competition ability, when keeping in mind modern demands.

It is the aim of the protective structure according to this invention to achieve a decisive improvement in the problems presented above and thus to raise substantially the level of knowledge in the field. To achieve this aim, the protective structure according to the invention is primarily characterized in, that the thermal insulation of a protective structure, that is meant particularly for temporary protecting of a field of grass and/or of ice comprises at least one, preferably plastic based, such as cell, cellular, foam plastic structured or a like thermal insulation layer, whereby a support arrangement, that is formed of the bottom surface of the same, comprises a platform structure projecting from the basic wall thickness of the thermal insulation layer, particularly to achieve an air space between the protective structure and the ground under the same.

As the most important advantages of the protective structure according to the invention may be mentioned simplicity and technical workability of the construction, production and use of the same. The structure according to the invention enables first of all a very good thermal insulation ability thanks to that, that in addition to the thermal insulation layer this influence is being effected by means of the air space between the protective structure and the ground. Furthermore the feet being arranged as a built-in platform structure directly to the bottom surface of the thermal insulation layer prevent first of all "burning" of the grass that is left under the protective structure, and on the other hand freezing of the type of protective structure in question onto the ice. The protective structure according to the invention is furthermore significantly lighter than the corresponding nowadays solutions, that is why it is idealistic both with a view to use, installation as well as storing. The protective structure according to the invention does not require either support arrangements to be attached to the same by separate work stages or other stiffening structures, but instead all the above may be produced totally built-in during production of the protective structure. The protective structure according to the invention is, as explained above, advantageous in that respect as well, that alike construction may be exploited in principle both for covering of fields of ice as well as of grass.

Advantageous embodiments of the protective structure according to the invention are represented in the dependent claims related to the same.

Figure 2A:
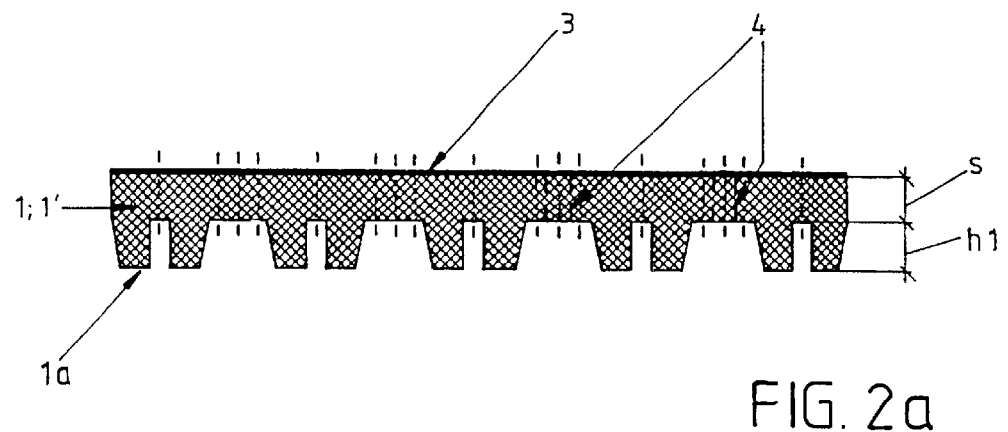
Figure 2B:
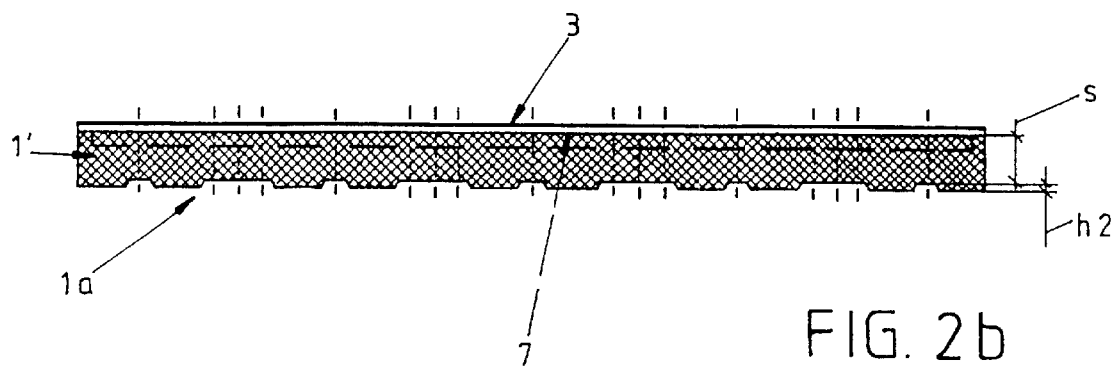
Figure 3A:
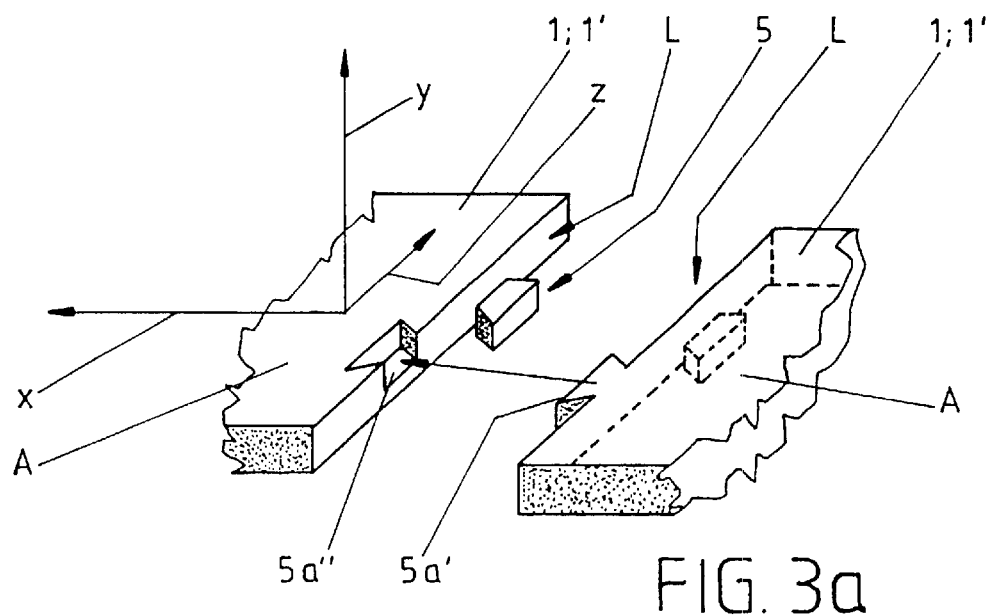
Figure 3B:
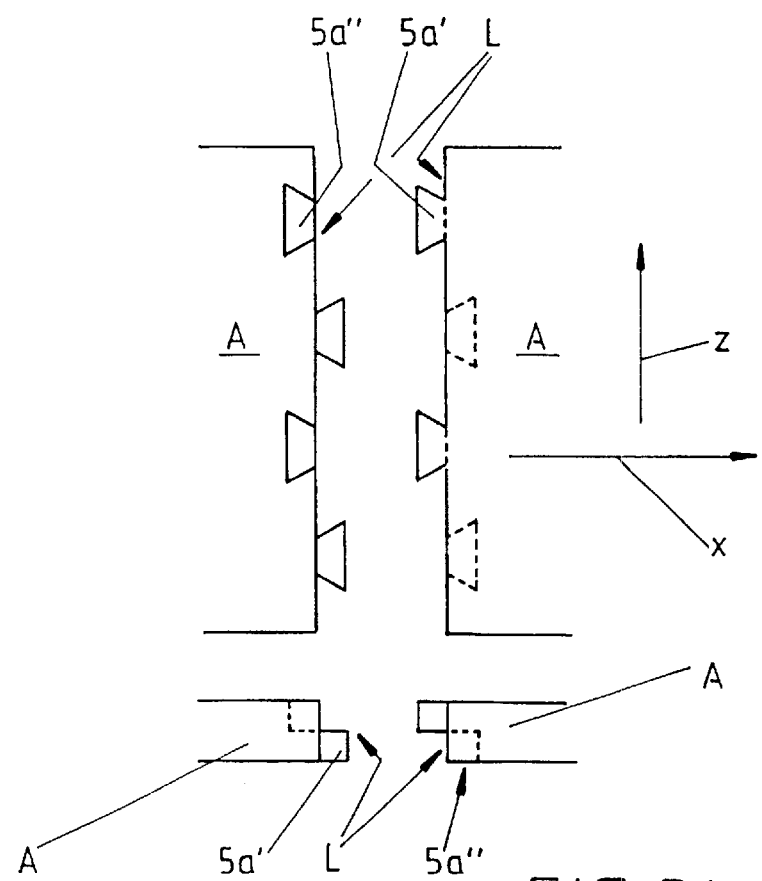
Figure 4A:
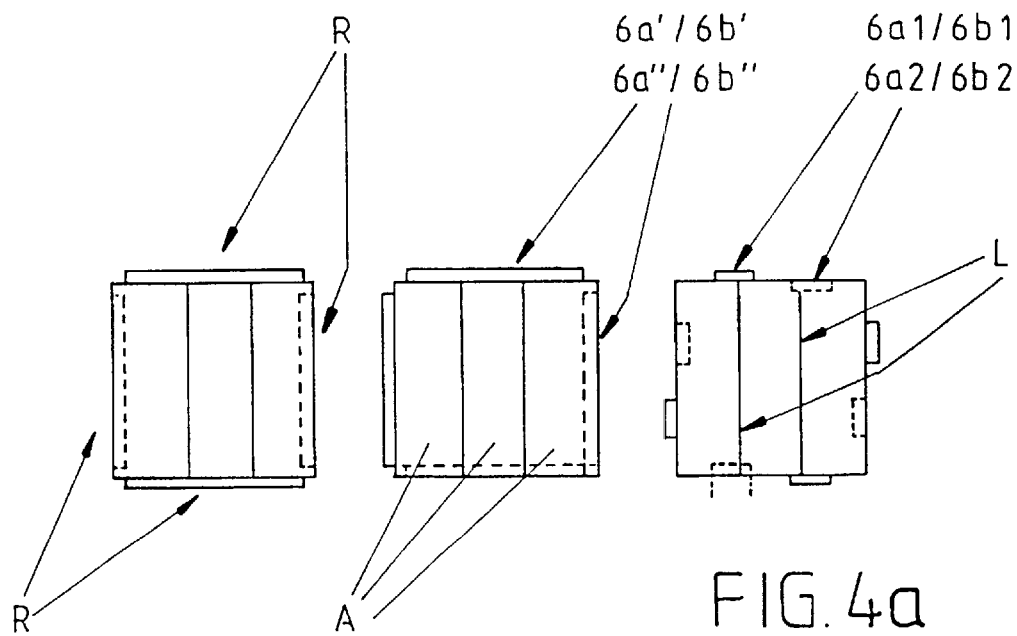
Figure 4B:
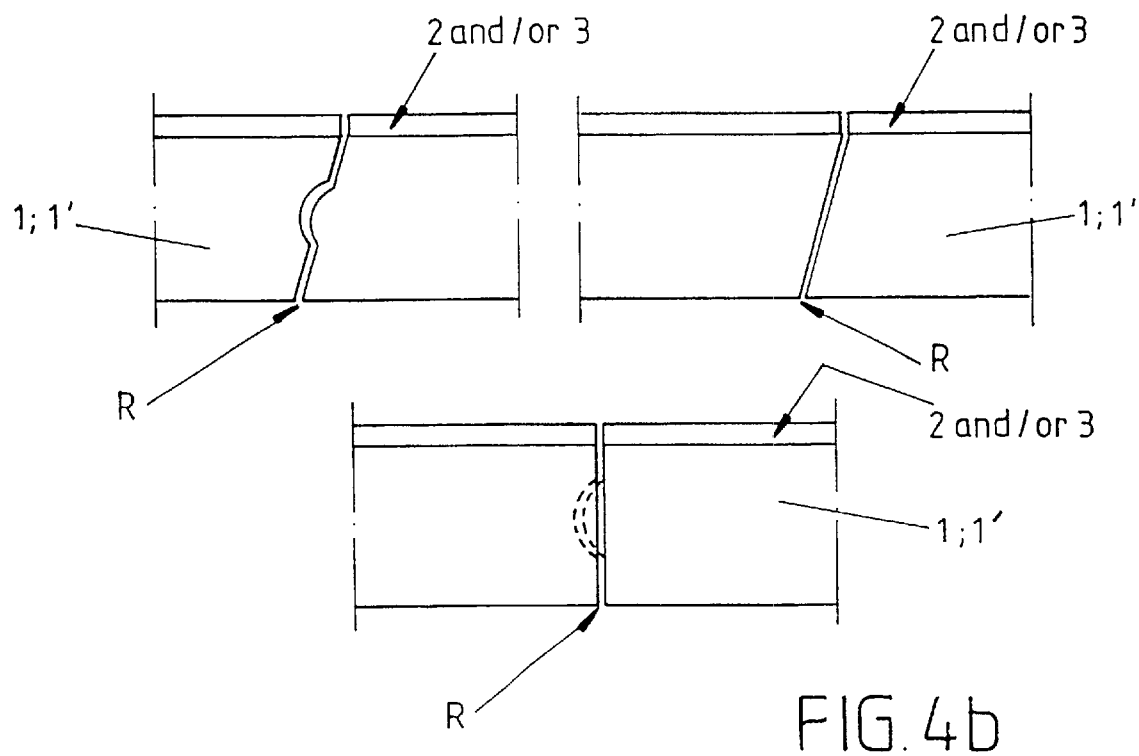
Figure 5:
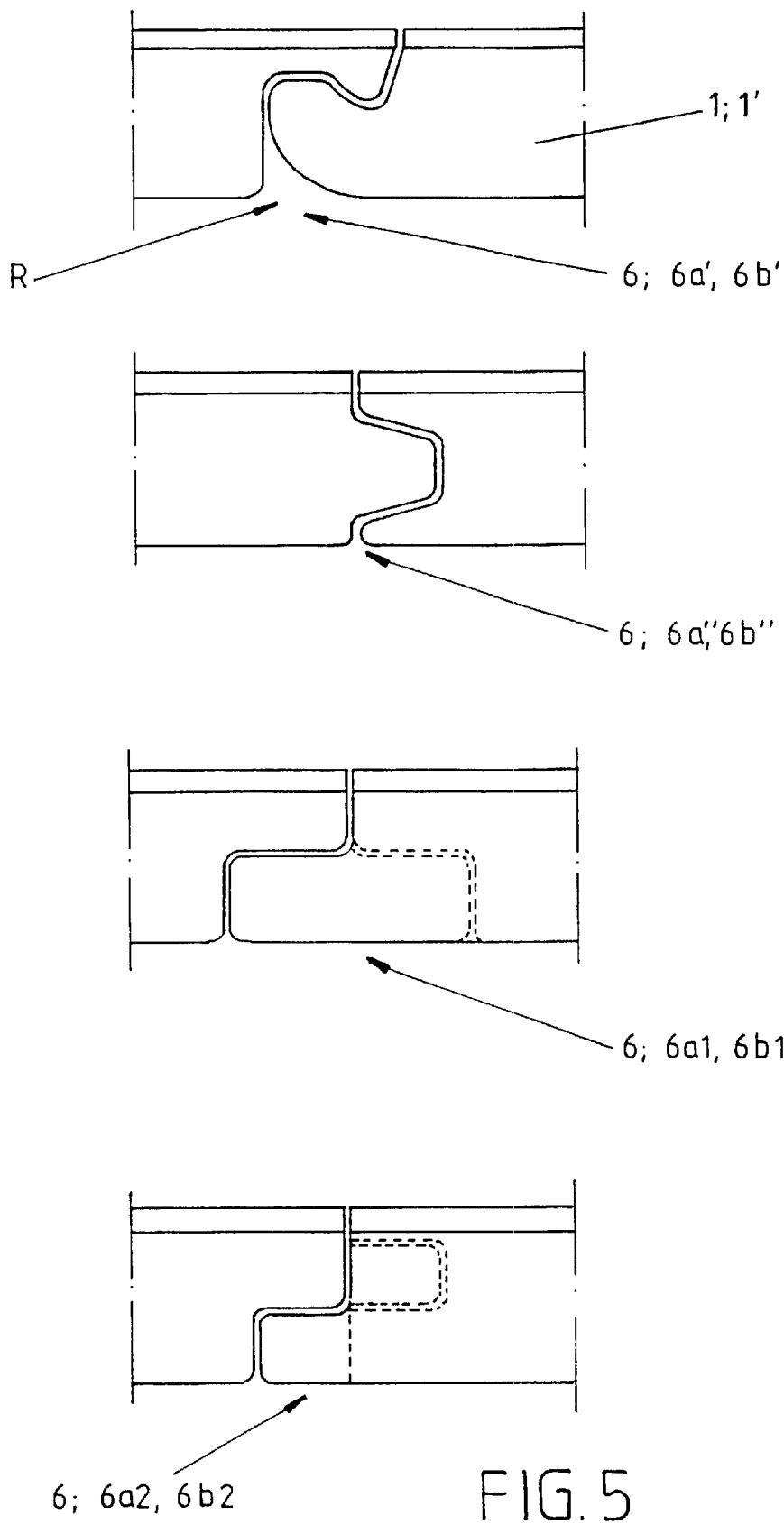

In the following description, the invention is illustrated in detail with reference to the appended drawings. In the drawings, FIGS. 1a and 1b show a principle of the thermal insulation layer belonging to the protective structure according to the invention as a detail from a point having a basic wall thickness, FIGS. 2a and 2b show some advantageous protective structures according to the invention particularly for covering of a field of grass (2a) and of ice (2b), FIGS. 3a and 3b show an advantageous form locking arrangement between the frame parts as a perspective view (3a) as well as a view seen from above and a side view (3b), FIGS. 4a and 4b show placement of fastening means being carried out differently to the protective structures as a view seen from above (4a) and one advantageous joint principle between the protective structures as alternative side views (4b), and FIG. 5 show some advantageous simplified fastening arrangements placed at the outer edges of the protective structures.

The invention relates to a protective structure, such as a protecting plate or element, that is meant particularly for covering of ground to protect and/or coat the same and/or for a like purpose. Into the protective structure there has been arranged at least a thermal insulation 1 and a support arrangement for supporting of the same onto the ground. The thermal insulation 1 of a protective structure, that is meant particularly for temporary protecting of a field of grass and/or of ice comprises at least one, preferably plastic based, such as cell, cellular, foam plastic structured or a like thermal insulation layer 1', whereby a support arrangement 1a, that is formed of the bottom surface of the same, comprises a platform structure projecting from the basic wall thickness s of the thermal insulation layer 1', particularly to achieve an air space between the protective structure and the ground under the same.

Figure 1B:
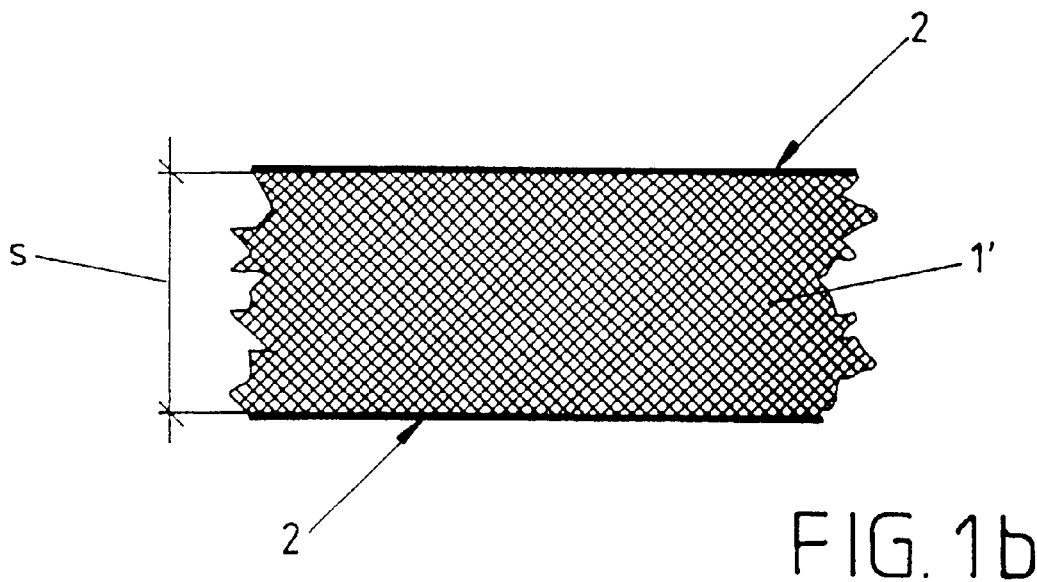

As an advantageous embodiment particularly with reference to FIG. 1b the thermal insulation layer 1' of the protective structure has been arranged coated preferably on both opposite sides of the same, preferably by spraying with thermoset type or a like coating material 2, particularly to achieve a damp stop to the boundary surfaces of the thermal insulation layer 1' or for example for strenghtening of the protective structure. In this connection it is naturally possible to use other type of coating materials as well, when exploiting suitable coating technics. The type of thermoset plastic materials as described above have actually such advantage, that they may be arranged by very simple work stages by spraying to the surface of the thermal insulation layer 1'. In this connection as the spraying method furthermore e.g. electrostatic coating or high pressure coating etc. may be furthermore exploited.

Furthermore with reference particularly to the advantageous embodiment shown in FIG. 1a, to the top surface of the thermal insulation layer 1' there has been attached, preferably by lamination with a coating material 2 or correspondingly a stiffening structure 3, such as a wooden, metal, plastic sheet, plate and/or a like. Furthermore as an advantageous embodiment the stiffening structure 3 has been arranged finished preferably during manufacturing of the protective structure, by arranging the top surface of the same coated with a damp proof, surface patterned, coloured and/or like coating 2'.

The protective structure shown in FIG. 2a is meant particularly for covering of a field of grass or like, whereby, to achieve an essentially uniform coating, it comprises preferably fastening means, being described in a greater detail in the text later on, to attach one or several adjacent corresponding protective structures to the same.

In the protective structure shown in FIG. 2a, the basic wall thickness s of the thermal insulation layer 1', that essentially acts as the frame part of the protective structure, is 30–80 mm. With a view to grass fields by tests in practice the wall thickness has been found to be advantageously 40 mm. With further reference to the figure in question for formation of the support arrangement 1a to the bottom surface of the frame part there has been arranged supporting feet or like, the height h1 of which is 20–80 mm, preferably 50 mm. In this connection it is furthermore, when needed, possible to arrange the protective structure to breathe by means of holes 4 passing through the same, preferably essentially vertically.

The aerobic air space belonging to the type of construction above gives the grass first of all a possibility to breathe, in addition to which it enables partial air flow between the ground and the protective structure. The air space in question gives furthermore room for growing of the grass, in which connection it has been found in practice, that a short period of use (1–3days) of the protective structure according to the invention accelarates growth of the grass, because advantageous growth circumstances are formed under the plate, that is very high humidity and nitrogen contents. By tests in practice it has been notified furthermore, that the grass is not allowed to get dry, that means to "burn" under the plate. In addition to that, thanks to the bottom structure as described above, only about 5–20% of the grass under the plate remains under mechanical stress.

Furthermore with reference to the advantageous embodiment shown in FIG. 2b, that is meant particularly for covering of a field of ice or a like ground, the basic wall thickness s of the thermal insulation layer 1', that acts essentially as the frame part of the protective structure, is 20–60 mm, preferably for example 22 mm. Tests in practice have shown that it may be even thinner particularly with a view to thermal insulation influence. Furthermore as an advantageous embodiment in the solution in question the height h2 of the supporting feet existing at the bottom surface of the same is 2–10 mm, whereby the height of feet of 3 mm has been found advantageous in practice.

As an advantage of the construction presented above it has been found, that it keeps the ice surface cool, but does not however freeze onto the surface of ice.

To achieve the effects described above it has been found furthermore in practice for example, that the number of support feet in the thermal insulation layer 1' is advantageously 25 pcs/m$^2$, the diameter D of which is preferably about 120 mm.

Furthermore as an advantageous embodiment, the frame part of the covering plate or element that means particularly the thermal insulation layer 1' has been manufactured to its final shape by the appearance of the same by cast moulding, foaming or compression moulding and/or correspondingly.

Furthermore as an advantageous embodiment, the fastening means acting for example by quick locking principle are arranged to the protective structure by process techniques, such as by casting, machining and/or correspondingly, as a part entirety belonging to the same essentially built-in.

Furthermore as an advantageous embodiment, each protective structure is formed of two or more frame parts A, that are, to achieve a uniform protective structure, coupled by means of a form locking arrangement 5, that is placed at the joint sides L of the same to be coupled to each other, and by means of a stiffening structure 3, such as by plate of ABS, PVC, PP plastics, electro-galvanized steel, plywood and/or a like, that is arranged in connection with the same, such as on top of the same, by lamination, thermal forming, gluing and/or correspondingly.

As an advantageous embodiment particularly with reference to FIGS. 3a and 3b the form locking arrangement 5 has been formed by means of form locking projections 5a' and locking grooves 5a", that are placed at corresponding points to one or several joint sides L of each frame part A and placed alternatively to the top and bottom edges of the same, that are aimed to prevent mutual movement of the frame parts A connected to each other preferably in three directions x, y, z perpendicular to each other.

As an advantageous embodiment the size of the protective structure is 500 mm×500 mm–1500 mm×3000 mm, preferably for example 1500 mm×1500 mm, wherein it is formed preferably of three frame parts A, the size of which is 500 mm×1500 mm. The measures mentioned above are advantageous first of all with a view to installation of the covering formed of the protective structures, because the protective structures may be transported to the installation site as big as possible. With a view to nowadays manufacturing techniques it has been found, however, more advantageous to produce with one mold frame parts, the size of which is 1500 mm×500 mm at the most, in which case the invention enables production of protective structure having an adequate size and that can be simply enough installed.

Furthermore as an advantageous embodiment, the thermal insulation 1 of the protective structure consists of EPS-material, such as expanded cellpolystyrene foam, styrox or like, XPS-material, such as extruded polystyrene foam, EPP-material, such as expanded polyprophylene foam, extruded polyethylene foam or extruded PVC structural foam sheet.

Furthermore as an advantageous embodiment particularly with reference to FIG. 4b the outer edge R of the protective structure is arranged chamfered and/or profiled, particularly to minimize flowing of air, heat conduction and/or like through the joints between the protective structures. The chamferings or profilings in question may be placed to only those parts of the outer edges, that remain free for the part of the fastening means or as well essentially at the point of the same.

Furthermore with reference particularly to the alternative solutions shown in FIG. 5, the fastening means 6 between the protective structures may comprise e.g. female and/or male couplers 6a, 6b e.g. at each outer edge R of the protective structure. In this connection it is possible to exploit thus a hook like locking 6a', 6b' shown in the uppermost figure, a groove locking 6a", 6b" shown in the following figure or a pin locking 6a1, 6b1 existing at the same level, as being exploited in the figure below the above, or furthermore a pin locking 6a2, 6b2 being represented in the lowermost figure, in which the pins exist in different levels. Furthermore with reference to alternative protective structure solutions shown in FIG. 4a the type of fastening arrangement 6 as described above may be placed in the surface structure e.g. in three different ways. In the figure on the left side the male and female joints are placed at the opposite outer edges R. In the middle figure the male and female joints are placed at adjacent edges and furthermore in the figure on the right the male and female parts have been placed adjacently at each edge of the surface structure. As explained above, the female and male couplers acting as fastening arrangement 6 may extend to the whole length of the side or they may consist of one or several shorter part entireties.

Furthermore as an advantageous embodiment particularly to FIG. 2b, an auxiliary support arrangement, such as one or several stiffening bars, ribs, profiles, frames and/or like have been arranged between the stiffening structure 3 and the thermal insulation layer 1'. The auxiliary support arrangement 7 in question may be carried out so, that it has been arranged totally built-in to the thermal insulation layer 1' during manufacturing of the same. The auxiliary support arrangement in question may be produced advantageously e.g. of wood, metal, plastic, coal fiber etc.

It is obvious, that the invention is not limited to the embodiments presented or described above, but it can be modified within the basic idea even to a great extent. In this connection it is naturally possible to equip the protective structure according to the invention more abundantly by exploiting e.g. according to traditional practice separate support arrangements or a totally separate coating, such as a wall-to-wall carpet, in connection with thermally insulative protective elements, that are coated only by the opposite surfaces of the same. It is naturally furthermore clear, that protective structures as represented above may be coupled to each other with most heterogeneous fastening arrangements. In addition to that the protective structures may be attached to each other in very many ways, in which case the fastening mechanism may be produced as described above integrally during production of the plate and that is a rigid arrangement and formed of the frame/surface material of the protective material. In addition to this rigid arrangements may be exploited in that way as well, that during manufacturing of the actual frame components, there has been exploited e.g. wooden, metal, metal structured or the like inserts. The inserts in question may be installed later on as well to the frame/surface plate.

What is claimed is:

1. A surface-covering protective structure, comprising: a thermal insulation layer having a basic wall thickness, fastening elements and a support arrangement integral with and projecting from the basic wall thickness of the thermal insulation layer, the support arrangement comprising a plurality of supporting feet each comprising a supporting surface being operable to engage a protected surface that the protective structure is arranged on, the support arrangement being operable to physically separate the basic wall thickness of the thermal insulation layer from the protected surface, the fastening elements being operable to couple adjacent protective structures together, whereby the protective structure including the basic insulation layer, the fastening elements, and the support arrangement comprises thermally insulating plastic material operable to thermally insulate the protected surface.

2. The protective structure according to claim 1, wherein the thermally insulating plastic material comprises at least one of cell, cellular, structured foam plastic.

3. The protective structure according to claim 1, further comprising:
a coating on at least one surface of thermal insulation layer.

4. The protective structure according to claim 3, wherein the coating provides at least one of a moisture barrier and a strenghtening structure.

5. The protective structure according to claim 3, wherein the coating comprises a thermoset material.

6. The protective structure according to claim 1, further comprising:
a stiffening structure attached to a top surface of the thermal insulation layer.

7. The protective structure according to claim 6, wherein the stiffening structure laminated on the thermal insulation layer.

8. The protective structure according to claim 6, wherein the stiffening structure comprises at least one of wood, metal, and plastic.

9. The protective structure according to claim 6, further comprising:

a coating on a top surface of the stiffening structure.

10. The protective structure according to claim 9, wherein the coating comprises at least one of a moisture proof coating, a surface patterned coating, and a colored coating.

11. The protective structure according to claim 1, wherein the thermal insulation layer has a basic wall thickness of about 30 mm to about 80 mm.

12. The protective structure according to claim 1, wherein the thermal insulation layer has a basic wall thickness of about 40 mm.

13. The protective structure according to claim 1, wherein the thermal insulation layer has a basic wall thickness of about 20 mm to about 60 mm.

14. The protective structure according to claim 1, wherein the thermal insulation layer has a basic wall thickness of about 22 mm.

15. The protective structure according to claim 1, wherein the support arrangement comprises supporting feet.

16. The protective structure according to claim 15, wherein the support arrangement a thickness of about 20 mm to about 80 mm.

17. The protective structure according to claim 15, wherein the support arrangement has a thickness of about 50 mm.

18. The protective structure according to claim 15, wherein the support arrangement has a thickness of about 2 mm to about 10 mm.

19. The protective structure according to claim 15, wherein the support arrangement a thickness of about 3 mm.

20. The protective structure according to claim 1, further comprising:

a plurality of breathing holes through the thermal insulation layer.

21. The protective structure according to claim 15, wherein the support arrangement comprises about 25 supporting feet per square meter.

22. The protective structure according to claim 15, wherein the supporting feet have a diameter of about 120 mm.

23. The protective structure according to claim 1, wherein the thermal insulation layer is manufactured to a final shape by at least one of cast molding, foaming, and compression molding.

24. The protective structure according to claim 1, wherein the protective structure comprises at least two frame parts, each frame part comprising the thermal insulation layer, the protective structure further comprising:

a locking arrangement arranged on joint sides of the at least two frame parts and operable to couple the fame pans together, and a stiffening structure operable to couple the fame parts together.

25. The protective structure according to claim 24, wherein the stiffening structure comprises a plate comprising at least one of ABS, PVC, PP plastics, electro-galvanized steel, and plywood, the plate is arranged on top of the frame parts and operably connected to the frame pans by lamination, thermal forming, or gluing.

26. The protective structure according to claim 24, wherein the protective structure has a size of about 500 mm by 500 mm to about 1500 mm to about 3000 mm.

27. The protective structure according to claim 24, wherein the protective structure has a size of about 1500 mm by 1500 mm.

28. The protective structure according to claim 2, wherein the protective structure comprises three frame parts each have a size of about 500 mm by about 1500 mm.

29. The protective structure according to claim 2, wherein the thermally insulating plastic material comprises at least one of EPS-material, XPS-material, EPP-material, extruded polyethylene foam, and extruded PVC structural foam sheet.

30. The protective structure according to claim 29, wherein the EPS-material comprises at least one of expanded polystyrene foam and styrox, the XPS material comprises extruded polystyrene foam, and The EPP material comprises expanded polyprophylene foam.

31. The protective structure according to claim 1, wherein an outer edge of the protective structure is at least one of chamfered and profiled to minimize at least one of air flow and heat conduction through joints between adjacent protective structures.

32. The protective structure according to claim 1, further comprising:

an auxiliary support arrangement.

33. The protective structure according to claim 32, wherein the auxiliary support arrangement comprises at least one stiffening bar, rib, profile, and frame.

34. The protective structure according to claim 32, wherein the auxiliary support arrangement comprises wood, metal, plastic, or carbon fiber.

35. The protective structure according to claim 32, wherein the auxiliary support arrangement is arranged within the basic wall thickness of the thermal insulation layer.

36. The protective structure according to claim 1, further comprising:

an auxiliary support arrangement arranged between the stiffening structure and the thermal insulation layer.

37. The protective structure according to claim 1, wherein the fastening elements comprise male couples extending from outer edges of the thermal insulation layers and complementary shaped female couplers extending into outer edges of the thermal insulation layers.

38. The protective structure according to claim 37, wherein the fastening elements extend along at least a portion of each edge of each thermal insulation layer.

* * * * *